United States Patent [19]

Lindahl

[11] 4,187,690
[45] Feb. 12, 1980

[54] ICE-MAKER HEAT PUMP

[75] Inventor: Herbert S. Lindahl, Danville, Ill.

[73] Assignee: Gulf & Western Manufacturing Company, New York, N.Y.

[21] Appl. No.: 934,079

[22] Filed: Aug. 16, 1978

[51] Int. Cl.² .............................................. F25C 1/08
[52] U.S. Cl. ...................................... 62/138; 62/277; 62/352; 165/61; 165/164
[58] Field of Search ................... 62/81, 352, 515, 73, 62/277; 165/61, 164

[56] References Cited

U.S. PATENT DOCUMENTS

| | | | |
|---|---|---|---|
| 2,226,271 | 12/1940 | Vose | 62/159 |
| 2,407,794 | 9/1946 | Muffly | 62/352 X |
| 2,590,499 | 3/1952 | Braswell, Jr. | 62/233 |
| 2,656,689 | 10/1953 | Muffly | 62/68 |
| 2,774,223 | 12/1956 | Muffly | 62/352 X |
| 2,967,402 | 1/1961 | Wilbushewich | 62/352 X |
| 3,053,058 | 9/1962 | Kocher | 62/352 X |
| 3,062,018 | 11/1962 | Baker | 62/81 |
| 3,181,309 | 5/1965 | Wilbushewich | 62/352 |
| 3,195,321 | 7/1965 | Decker | 62/81 X |
| 3,218,823 | 11/1965 | Blain et al. | 62/278 |
| 3,435,633 | 4/1969 | Dixon | 62/352 |
| 3,537,274 | 11/1970 | Tilney | 62/234 X |
| 3,563,304 | 2/1971 | McGrath | 165/2 |
| 4,044,568 | 8/1977 | Hagen | 62/73 |
| 4,107,943 | 8/1978 | Ohling | 62/352 X |
| 4,122,686 | 10/1978 | Lindahl et al. | 62/81 |

OTHER PUBLICATIONS

Fischer, H. C., "Ice Maker Heat Pump: A New Tool for Energy Conservation", Refrigeration Service and Contracting, Jan. 1977, pp. 23-30.

Fischer, H. C., "Ice Maker Heat Pump: Part II", Refrigeration Service and Contracting, Feb. 1977, pp. 21-24.

Primary Examiner—William F. O'Dea
Assistant Examiner—William E. Tapolcai, Jr.

[57] ABSTRACT

An ice-making heat pump system is disclosed which includes a number of evaporator freezing plates, each of the plates having two fluid passageways therein. One of the passageways is arranged to conduct boiling refrigerant fluid for freezing water on the surfaces of the plate. The other passageway is arranged to conduct warm condensed refrigerant for harvesting ice formed on the plate surface. A fluid valve arrangement is also provided to connect the plates with the rest of the system so that ice can be selectively formed and released from the outer surfaces of the freezing plates.

36 Claims, 3 Drawing Figures

ICE-MAKER HEAT PUMP

DESCRIPTION OF THE INVENTION

The present invention relates generally to refrigeration systems, and more particularly to an ice-making heat pump including evaporator plates on which ice can be selectively formed and harvested to provide both cooling and heating source capabilities.

Ice-maker heat pump systems for heating and cooling of building space or water are known in the refrigeration art, a discussion of such systems appearing in an article by H. C. Fischer entitled "Ice-Maker Heat Pump: A New Tool For Energy Conservation", *Refrigeration Service and Contracting*, January, 1977 at page 23 and February, 1977 at page 21. Basically, these systems include an indoor heat exchanger, a compressor, and one or more evaporator freezing plates brought into contact with a water spray. Boiling refrigerant is directed through passageways in the plates to cause ice to form on the plate surfaces. The ice is then harvested or released from the plates by directing warm liquid refrigerant through the same passageways, thereby causing the ice to fall into an insulated tank or bin. The collected ice can be stored during the winter heating season and used later for summer cooling.

An example of an ice-making heating and cooling system is also disclosed in U.S. Pat. No. 4,044,568 to Hagen. In this system, a number of valves are used to selectively direct liquid refrigerant to freezing plates from which ice is to be released, while a different set of valves operate to direct boiling refrigerant to other plates on which ice is to be formed.

The above prior systems suffer from the disadvantage of having to return liquid refrigerant to the compressor from the plate or plates from which the ice is being released. It will be appreciated that since a compressor is essentially a vapor pump, its operation is deleteriously affected by the introduction of the liquid and its life and efficiency are thereby substantially reduced.

The above problem of returning warm liquid refrigerant to the compressor may be overcome by directing the liquid, after it leaves the heated freezing plates, through an expansion device and into another evaporator freezing plate which is then cooled by the boiling refrigerant. Such an arrangement is disclosed in U.S. Pat. No. 3,537,274 to Tilney. However, a four-way fluid valve is required, in addition to a separate set of check valves should the expansion devices themselves not block reverse flow of refrigerant. Accordingly, use of common expansion devices such as a capillary tube would therefore necessitate several different fluid valves, and the overall reliability of a system as disclosed in the Tilney patent would suffer.

Evaporators including a separate conduit for passing warm refrigerant therethrough to defrost the evaporator are also known, examples appearing in U.S. Pat. Nos. 3,195,321 to Decker, et al.; and 3,218,823 To Blain, et al. In order to prevent liquid refrigerant from returning to the compressor, both Decker and Blain provide separate means for boiling the liquid before returning it to the compressor, i.e., evaporation by hot compressed gas in Decker, and expansion by a capillary in Blain. However, there is no suggestion in either Decker or Blain of arranging a number of the evaporators disclosed therein for selective ice-making and harvesting operations.

The above and other shortcomings in the prior art are overcome by the present invention which relates to an evaporator for use in an ice-making heat pump system including a compressor for circulating a supply of refrigerant, a condenser, and an evaporator in heat exchange relationship with water. The evaporator of the present invention includes a plurality of freezing plates. Each of the freezing plates has a first passageway for conducting relatively cold or boiling refrigerant to freeze water in contact with the plate, and a second passageway for conducting relatively warm liquid refrigerant to release ice formed on the plate. A valve arrangement is also provided to direct refrigerant between the passageways of the freezing plates so as to selectively form and release ice on the freezing plates.

An expansion device such as an expansion valve or a capillary tube is preferably coupled between the outlet of the second passageway in one of the freezing plates and the inlet of the first passageway in another of the freezing plates.

Further, it is desirable that the valve or valves used to direct the flow of refrigerant be actuated in response to a predetermined temperature or thickness of ice formed on the freezing plates.

Accordingly, it is an overall object of the present invention to overcome the shortcomings of the prior art and to provide an ice-maker heat pump of basically simple construction which provides for extended reliable operation.

It is a further object of the present invention to provide an ice-maker heat pump in which there is a negligible quantity of liquid refrigerant returned to the compressor in the system.

It is a still further object of the present invention to provide an ice-maker heat pump having a minimal number of simple fluid valves.

The above description as well as further objects, features and advantages of the present invention will be more fully understood by reference to the following detailed description of the presently preferred, but nonetheless illustrative, embodiments in accordance with the present invention, when taken in conjunction with the accompanying drawings, wherein.

Figure 1:
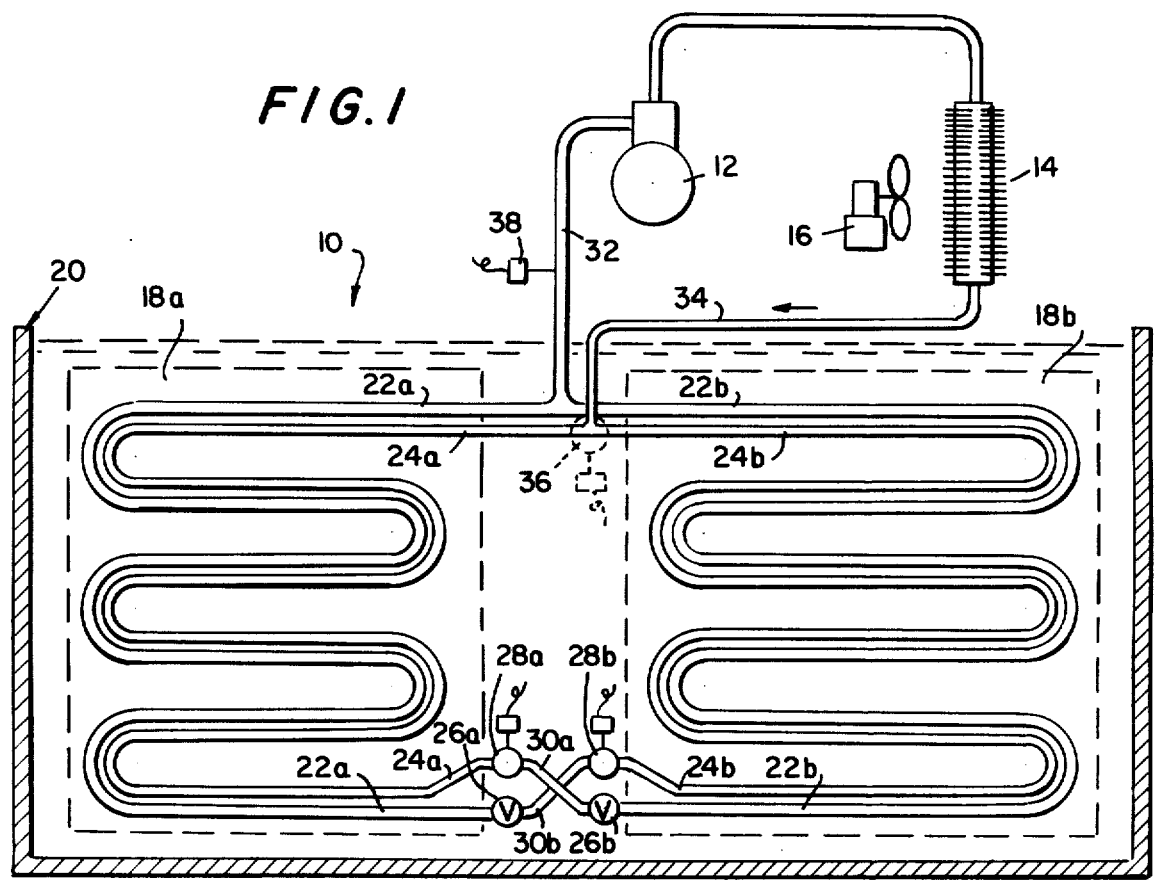
FIG. 1 is a schematic representation of an embodiment of the present invention.

Referring now in detail to the drawings and particularly to FIG. 1 thereof, there is shown an illustrative ice-making heat pump system embodying features of the present invention, generally designated by the reference numeral 10.

Basically, the system includes a compressor 12, a condenser 14 which, for example, may be arranged in heat exchange relationship with respect to a space to be heated within a building by way of a circulating fan 16, and an evaporator including a pair of evaporator freezing plates 18a and 18b, respectively. The compressor 12, condenser 14 and fan 16 may all be conventional units, their size and operating parameters being dictated only by the desired capabilities of the system 10.

In the embodiment shown in FIG. 1, evaporator plates 18a, 18b are submerged in water contained in a tank 20. The plates 18a, 18b should be a sufficient distance below the top surface of the water in order that ice formed on and later released from either of the plates 18a, 18b can float toward the top of the water without accumulating to a depth which would interfere with the further release of ice from either of plates 18a, 18b. The relative size of the freezing plates 18a, 18b with respect to the tank 20 need not be as large as that suggested in FIG. 1, the representation therein of plates 18a, 18b being only schematically shown.

Each of the freezing plates 18a, 18b includes cooling passageways 22a, 22b, extending respectively therethrough. Passageways 22a, 22b are preferably in the form of copper tubing and are arranged to conduct relatively cold, boiling refrigerant in heat exchange relationship with the water in the tank 20. These cooling passageways have inlet ends which are shown at the bottoms of the plates 18a, 18b in FIG. 1, and have outlet ends which appear toward the tops of the plates.

Each of the plates 18a, 18b also includes heating passageways 24a, 24b, extending respectively therethrough, the passageways 24a, 24b also preferably formed of copper tubing and arranged to conduct relatively warm liquid refrigerant in heat exchange relationship with ice formed on the outer surfaces of the plates 18a, 18b, respectively. Inlet ends of the heating passageways are shown toward the tops of the plates, and their outlet ends are toward the bottoms of plates 18a, 18b in FIG. 1.

Coupled to the inlet end of each of the cooling passageways 22a, 22b, as shown toward the bottom of FIG. 1, are expansion devices 26a, 26b, respectively. These devices are preferably in the form of conventional expansion valves or capillary tubes. Also, conventional solenoid valves 28a, 28b are each coupled at one end to the outlet end of heating passageways 24a, 24b, respectively, as shown toward the bottom of FIG. 1. Solenoid valve 28a is connected at its other end to the expansion device 26b by way of conduit 30a. Similarly, solenoid valve 28b is connected at its other end to the expansion device 26a by a separate conduit 30b.

The outlet ends of each of the cooling passageways 22a, 22b are joined together as by a T-fitting, as shown toward the top of FIG. 1, which communicates vapor refrigerant in both of the passageways 22a, 22b back toward the compressor 12 by way of a suction return line 32. Also, the inlet ends of both the heating passageways 24a, 24b are joined together as by another T-fitting which communicates relatively warm liquid refrigerant from the condenser 14 through liquid line 34 to both of the heating passageways 24a, 24b.

Alternatively, the solenoid valves 28a, 28b can be eliminated, and direct connections provided between the outlet ends of heating passageways 24a, 24b and the expansion devices 26b, 26a, respectively. In such a case, single three-way valve 36, shown dotted in FIG. 1, replaces the T-fitting connection otherwise provided between the inlet ends of the heating passageways 24a, 24b. Valve 36 may be conventional and should be of a type which, upon actuation, communicates warm refrigerant in liquid line 34 to a selected one of the heating passageways 24a and 24b.

In order that the ice-making and ice-harvesting operations of each of the freezing plates 18a, 18b may be automatically controlled, an actuating device 38 can be coupled to the suction return line 32 to selectively actuate the solenoid valves 28a, 28b, or the three-way valve 36, and thereby control the flow of both expanded and warm refrigerant through the passageways in each of the freezing plates 18a, 18b. Actuating device 38 may be a conventional temperature sensor set to be responsive to a predetermined thickness of ice which accumulates on the freezing plates. The device 38 is coupled to the valves by way of an unshown conventional alternating switch and voltage source.

It will further be appreciated that conventional cold water circulating means (unshown in FIG. 1) including a pump and a heat exchanger may be arranged in combination with the system 10. A cold water pickup line can extend below the surface of the water in the tank 20, and the water may then be drawn up to be pumped and circulated in heat exchange relationship with a space to be cooled within a building. A separate return line, opening above the tank 20, would also be provided for returning the circulated water to the tank. Accordingly, the system 10 of FIG. 1 can provide both heating and cooling functions.

In operation, as described earlier, the present ice-making heat pump system 10 causes ice to be formed on one of the evaporator plates 18a, 18b while the other plate harvests ice previously formed thereon. Heat extracted from the water in the tank 20 is recovered by way of the compressor 12 and condenser 14, and can then be used with the assistance of the circulating fan 16, for example, to distribute the recovered heat throughout a space to be heated in a building. Once ice formed on one of the plates 18a, 18b reaches a thickness at which the heat recovered by refrigerant flowing through the plate starts to significantly decrease, e.g., about ¼ inch (0.64 cm.), ice is harvested from that plate while the other plate, which has previously been harvesting ice, is brought into an ice-making mode of operation.

For purposes of the following description, it will be assumed that solenoid valves 28a, 28b are incorporated in the system 10, and that a direct T-fitting connection is provided between the heating passageways 24a, 24b and the condenser 14. Also, it will be assumed that the system is in a condition such that solenoid valve 28a is open and solenoid valve 28b is closed.

Relatively warm refrigerant leaves the compressor 12 in vapor form at high pressure and enters condenser 14 whereat the high pressure refrigerant vapor condenses and heat is released therefrom. The released heat is directed by fan 16 to an area to be heated.

The condensed refrigerant continues through liquid flow line 34 to the T-connection provided between the heating passageways 24a, 24b and down through these passageways to the solenoid valves 28a, 28b. Since valve 28b is closed, the condensed refrigerant is prevented from moving therepast and remains stationary within heating passageway 24b.

The solenoid valve 28a being open, condensed refrigerant flows therepast from the heating passageway 24a and into the expansion device 26b associated with cooling passageway 22b. The flow of condensed refrigerant through heating passageway 24a thereby allows heat to be transferred from the refrigerant to the freezing plate 18a so as to harvest ice previously formed on the surface of freezing plate 18a. As the condensed liquid refrigerant passing through valve 28a is under high pressure, its passage through the expansion device 26b substantially reduces the pressure thereof, thereby allowing it to evaporate as it flows within the cooling passageway 22b of freezing plate 18b. The boiling refrigerant then flows through passageway 22b, and the cooling effect thereof freezes water present on the outer surface of the freezing plate 18b. The vapor, after leaving the outlet of passageway 22b, is returned to compressor 12 by way of suction line 32.

As ice continues to form on freezing plate 18b, it has been found that the ability of the boiling refrigerant to remove heat from the surrounding water starts to diminish significantly once the ice reaches a thickness of about ¼ to ½ inch (0.64 to 1.27 cm.) on the freezing plate surface. After ice is formed on freezing plate 18b to a predetermined thickness in the above range, actuating device 38 senses a corresponding suction temperature drop and causes solenoid valve 28a to close and solenoid valve 28b to open. Additional refrigerant is prevented from entering the cooling passageway 22b. Relatively warm, condensed refrigerant including the refrigerant previously stationary in passageway 24b is permitted to circulate in passageway 24b to harvest ice from the surface of freezing plate 18b. This refrigerant passes through valve 28b and expansion device 26a into the cooling passageway 22a where it boils so as to freeze water in contact with the surface of freezing plate 18a. Vapor refrigerant leaving the outlet of passageway 22a is then returned to the compressor 12 by way of the suction line 32. It will be appreciated that stationary condensed refrigerant in passageway 24a will not prevent ice from being formed on freezing plate 18a, its movement being prevented by the closed solenoid valve 28a.

Because of the above-described construction and arrangement of the ice-making heat pump system 10, those skilled in the art will appreciate that ice-making and harvesting is selectively performed by evaporator freezing plates 18a, 18b without introducing hot gas or warm liquid refrigerant into the cooling passageways 22a, 22b of the plates. Accordingly, successful operation and long life of the compressor 12 is assured in that liquid is not accumulated in the cooling passageways 22a, 22b to be returned to the compressor 12 as in some of the above prior systems.

In the event it is desired to use the single three-way valve 36 instead of the solenoid valves 28a, 28b, the operation of the system 10 remains much the same as described above. Assuming that the valve 36 is set to allow the condensed liquid refrigerant leaving condenser 14 through line 34 to enter heating passageway 24a, the relatively warm refrigerant will cause ice previously formed on freezing plate 18a to be harvested. The refrigerant leaves passageway 24a and directly enters expansion device 26b, thereby evaporating within the cooling passageway 22b to cause water in contact with the surface of freezing plate 18b to become frozen. The vapor refrigerant leaves the outlet of passageway 22b to enter suction line 32, and returns to compressor 12. When a predetermined thickness of ice is formed on the surface of freezing plate 18b, actuating device 38 responds to cause valve 36 to change its position and redirect the flow of warm condensed refrigerant through the heating passageway 24b of freezing plate 18b and into the expansion device 26a associated with freezing plate 18a. This movement of the condensed refrigerant causes ice formed on the surface of freezing plate 18b to be harvested.

As the refrigerant flows past expansion device 26a, its pressure is reduced so as to allow it to boil within cooling passageway 22a and to freeze water on the surface of associated freezing plate 18a. The vapor refrigerant leaves the outlet of passageway 22a for return to compressor 12 by way of suction line 32. It will be understood that condensed refrigerant within passageway 24a remains stationary owing to the position of the valve 36, and therefore does not prevent the cooling of freezing plate 18a by evaporating refrigerant in passageway 22a. Once ice formed on the surface of freezing plate 18a reaches the predetermined thickness, actuating device 38 again responds to cause the three-way valve 36 to return to its prior position and the operational modes of freezing plates 18a, 18b are again interchanged.

Figure 2:
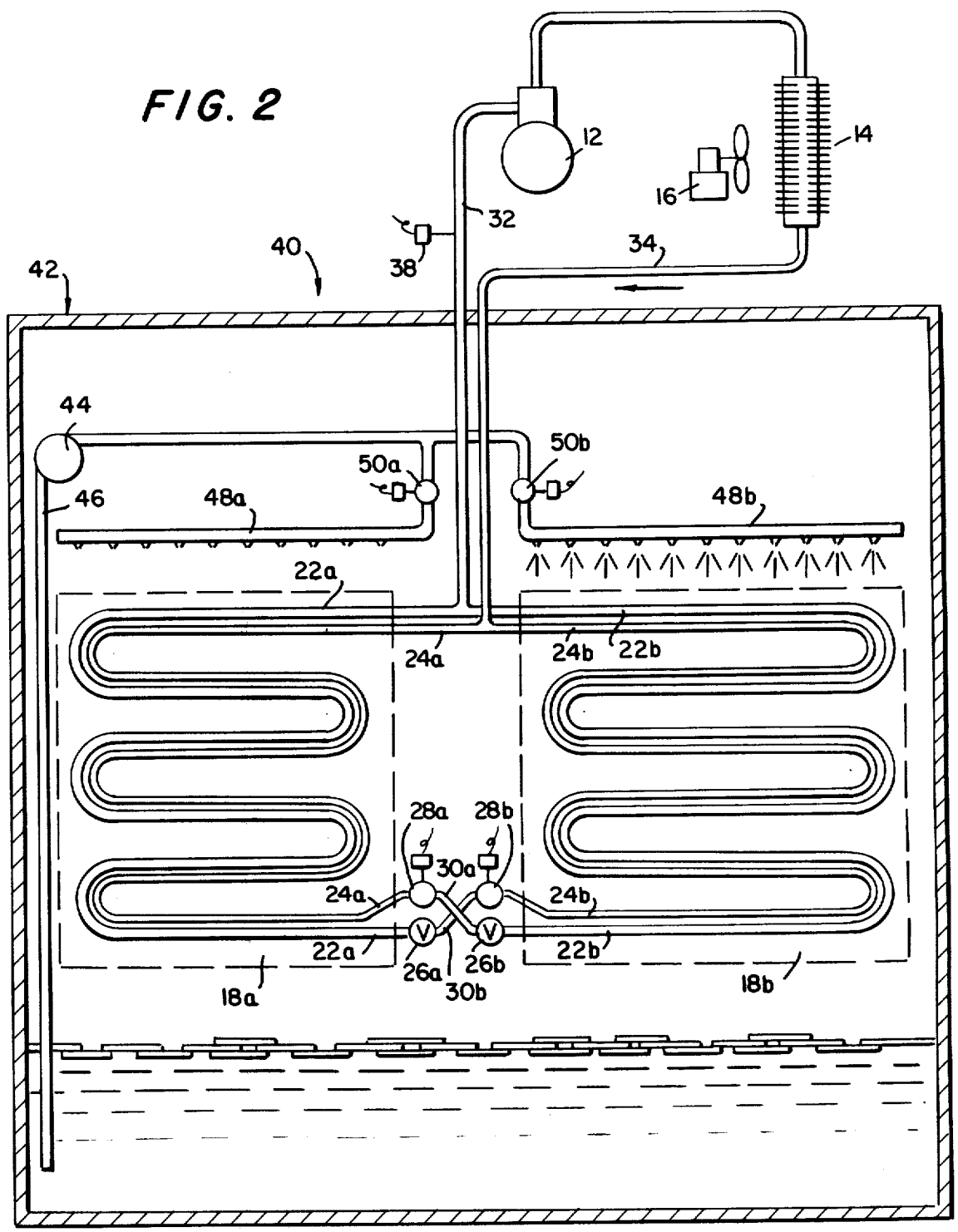
FIG. 2 is a schematic representation of a second embodiment of the present invention.

A second embodiment of the present invention is shown in FIG. 2. This embodiment, designated generally by reference numeral 40, includes a water storage tank 42 for containing a quantity of water above which the freezing plates 18a and 18b are suspended. In order to bring water in the tank 42 into contact with the outer surfaces of the freezing plates 18a, 18b, a water-circulating pump 44 is disposed in tank 42 above the water level, and operates to pump the water through a conduit 46 and into a pair of spray heads 48a, 48b mounted above and over each of the freezing plates 18a, 18b, respectively. Associated with each of the spray heads 48a, 48b are solenoid shutoff valves 50a, 50 b, respectively.

Apart from the relative positioning of the freezing plates 18a, 18b with respect to the water in tank 42, ice-making heat pump system 40 in FIG. 2 is in other respects similar to the system 10 of FIG. 1. It will be appreciated, however, that harvesting of ice from the freezing plates 18a, 18b can be facilitated by keeping the freezing plate outer surfaces free of chilled water during the harvesting mode of operation of each of the plates. Accordingly, the water spray from the spray heads 48a, 48b onto the freezing plates 18a, 18b is controlled by valves 50a, 50b so that water is sprayed only on the plate which is being cooled by refrigerant. The valves 50a, 50b are selectively energized by way of the actuating device 38 in the same manner by which the device 38 actuates the refrigerant shutoff valves 28a, 28b, as explained in regard to the embodiment of FIG. 1.

It will be appreciated that when refrigerant shutoff valve 28a is opened to allow refrigerant to boil within freezing plate 18b to freeze water on the surface thereof, valve 50b is also opened to permit the spray head 48b to spray freezing plate 18b with water, as shown in FIG. 2. Conversely, when freezing plate 18a is in the ice-making mode wherein refrigerant valve 28b is opened to permit refrigerant to boil within the plate 18a, then valve 50a is opened to spray water down upon freezing plate 18a, thereby enabling ice to form on the surface of plate 18a.

Although not shown in FIG. 2, the system 40 can also operate with the single three-way valve 36 as in the embodiment of FIG. 1, the two refrigerant shutoff valves 28a, 28b then being bypassed.

Also, a separate cold water circulating system (unshown in FIG. 2) can be arranged to circulate chilled water in the tank 42 through a heat exchanger in a building to provide cooling, as described above in connection with the embodiment of FIG. 1.

Thus far, the present invention has been described as including a single pair of freezing plates 18a, 18b, one of which forms ice on its surface while the other harvests ice thereon, these operations being interchanged after a predetermined thickness of ice develops on either of them. It will be understood that any number of pairs of freezing plates, each pair being interconnected as shown in FIG. 1 or 2, may all be connected in parallel with compressor and condenser units of suitable size to thereby increase the heating and cooling capacity of the entire system. Accordingly, the present invention is not limited to a single pair of freezing plates as shown in FIGS. 1 and 2.

Figure 3:
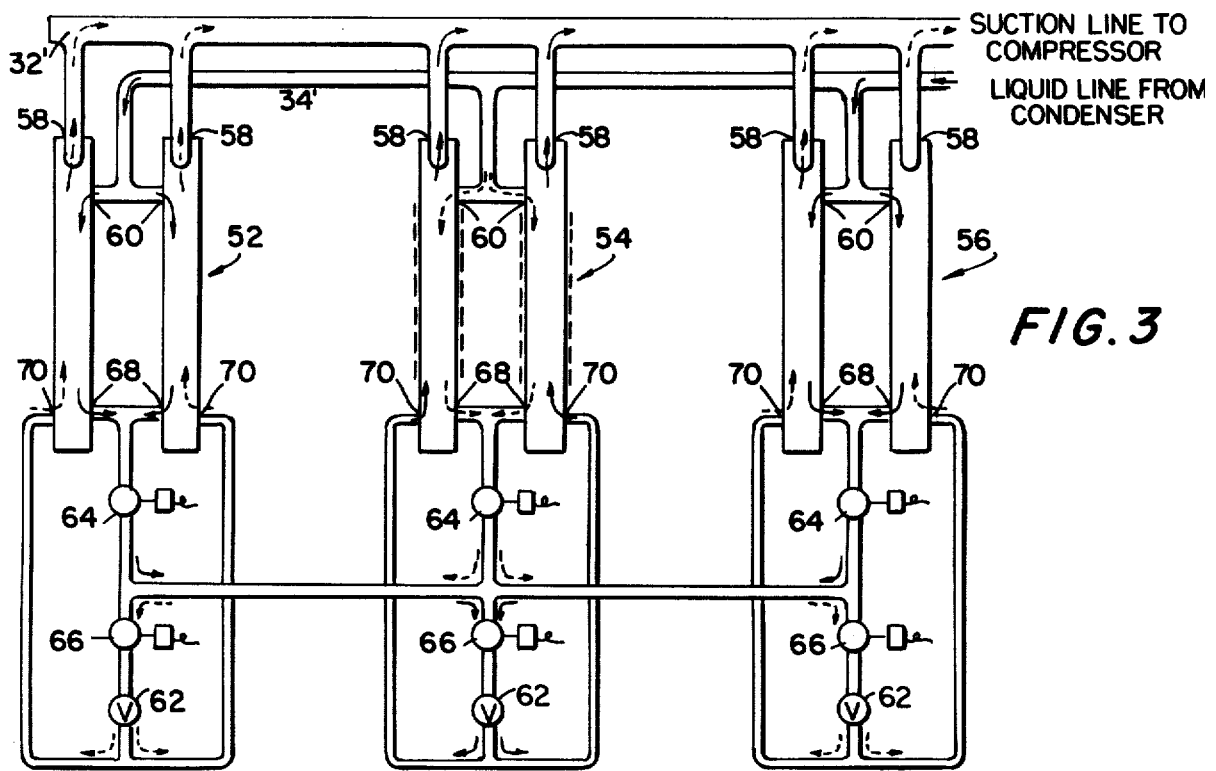
FIG. 3 is a schematic representation of a third embodiment of the present invention.

FIG. 3 represents a third embodiment of the present invention in which a number of sets of freezing plates (three pairs being illustrated) are arranged so that both plates in a given pair either form or harvest ice together at a particular time. It will be understood that any number of freezing plate sets may be used, with two or more freezing plates in each set, provided a compressor and condenser of suitable capacity are employed. For convenience in the following description, the three illustrated pairs of freezing plates are designated by numerals 52, 54 and 56, respectively.

Each of the evaporator plates includes separate cooling and heating passageways (unshown) as do the evaporator plates 18a and 18b in the embodiments of FIGS. 1 and 2. The cooling passageways of the evaporator plates in FIG. 3 have their outlet ends at 58 connected with the suction line 32' leading to the low pressure side of an unshown compressor. Also, the inlet ends of the heating passageways are connected at 60 to the condenser liquid line 34'.

The evaporator plate pairs 52, 54 and 56 are interconnected by a valve arrangement as shown in the lower half of FIG. 3, including a set of expansion devices 62 associated with each of the freezing plate pairs. In this embodiment, freezing plate pair 54 can be selected for the ice-forming mode of operation while the remaining two pairs 52, 56 operate to harvest ice previously formed thereon. Alternatively, plate pair 54 is caused to harvest the ice formed thereon while the other two pairs 52, 56 form ice on their surfaces. The former mode of operation is depicted by solid arrows representing refrigerant flow, and the dotted arrows represent flow of refrigerant during the latter mode of operation.

The valve arrangement in the system of FIG. 3 includes a set of refrigerant shutoff solenoid valves 64, 66 for each evaporator plate pair, and operates to direct the flow of warm condensed refrigerant leaving the heating passageways of one pair of evaporator plates through an expansion device 62 and into the cooling passageways of another evaporator plate pair. For example, solid arrows are used to illustrate the refrigerant flow through the system of FIG. 3 at a time when the middle evaporator plate pair 54 is forming ice, and the outer plate pairs 52 and 56 are harvesting ice.

As seen in FIG. 3, condensed, relatively warm liquid refrigerant enters the heating passageways at 60 in plate pairs 52 and 56, and heats these plates to release ice formed on their outer surfaces. The liquid refrigerant moves out from the heating passageways at 68 and past shutoff valves 64 which are considered to be open. The refrigerant then flows toward the plate pair 54, past shutoff valve 66 associated therewith and also presumed to be open, and through the expansion device 62 associated with freezing plate pair 54. Boiling refrigerant then enters into inlets 70 of the cooling passageways in plate pair 54, thereby freezing water present on the outer surfaces of plate pair 54. The vapor refrigerant continues to move through outlets 58 of the cooling passageways and is returned to the compressor by way of suction line 32'.

After the build-up of a predetermined thickness of ice on freezing plate pair 54, all the shutoff valves 64 and 66 are switched so as to redirect the flow of warm liquid refrigerant through freezing plate pair 54, rather than through plate pairs 52 and 56. Accordingly, as shown by the dotted arrows in FIG. 3, condensed refrigerant is permitted to flow through the heating passageways in plate pair 54 at inlets 60 so as to heat and release ice formed on the surfaces of these plates. The refrigerant leaves the plates 54 at outlets 68 and flows past the associated valve 64 which is now in an open position. valve 66 associated with the plate pair 54 now being closed, the liquid refrigerant moves toward the valves associated with the outer freezing plate pairs 52 and 56. The refrigerant then passes through associated valves 66 and expansion devices 62. Boiling refrigerant then enters the cooling passageways of outer plate pairs 52 and 56, at 70, and boils through these cooling passageways to form ice on the outer surfaces of the respective plates. The vapor refrigerant leaves the cooling passageways at outlets 58 to return to the compressor by way of the suction line 32'.

The particular freezing plate arrangement shown in FIG. 3 can be adapted for use in a system such as shown in FIG. 1, wherein the freezing plates are submerged in water, or in a system as shown in FIG. 2, wherein the freezing plates are suspended above water and a spray or shower of water is selectively directed on those freezing plates in an ice-making mode of operation.

A latitude of variation, modification, change and substitution is intended in the foregoing disclosure. For example, instead of providing the actuating device 38 for switching the valves associated with the freezing plates herein disclosed, other devices directly responsive to the build-up of a predetermined thickness of ice may be located on the freezing plates themselves, or a conventional timing device can be used to periodically switch the operational modes of the plates. Also, although water is a preferred liquid to be used for transferring heat contained therein to refrigerant within the present freezing plates, other liquids may be used as would be well-known to those skilled in the art. Therefore, it is appropriate that the appended claims be construed broadly and in a manner consistent with the spirit and scope of the invention.

What is claimed is:

1. An improved evaporator for an ice-making heat pump of the type which includes a compressor for circulating a supply of refrigerant, a condenser, and an evaporator, said evaporator adapted to be arranged in heat exchange relationship with water to be in contact therewith and comprising a plurality of freezing plates, each of said freezing plates having a first passageway therein arranged to conduct relatively cold evaporating refrigerant therethrough in heat exchange relationship with water to be in contact with the outer surfaces of said freezing plates to form ice on the outer surface of at least one of said freezing plates, and a second passageway therein arranged to conduct relatively warm refrigerant therethrough in heat exchange relationship with the ice to be formed on the outer surface of at least one of said freezing plates to release said ice, each of said passageways having inlet and outlet ends, respectively, and valve means coupled between said freezing plates arranged to selectively direct said refrigerant between said first and second passageways in each of said freezing plates to enable said ice to be selectively formed on and released from the outer surfaces of said freezing plates when said evaporator is operatively connected to said heat pump.

2. An evaporator according to claim 1 further including means for reducing the pressure of the refrigerant coupled between the outlet end of the second passageway of one of said freezing plates and the inlet end of the first passageway in another of said freezing plates.

3. An evaporator according to claim 2, wherein said pressure reducing means comprises an expansion valve.

4. An evaporator according to claim 2, wherein said pressure reducing means comprises a capillary tube.

5. An evaporator according to claim 1, wherein said valve means comprises a fluid valve and further includes means for actuating said fluid valve in response to ice formed on at least one of said freezing plates.

6. An evaporator according to claim 5, wherein said actuating means actuates said fluid valve in response to a predetermined thickness of ice.

7. An ice-making heat pump system comprising a compressor for circulating a supply of refrigerant through said system, a condenser arranged in heat exchange relationship with said refrigerant for removing heat from said refrigerant, and evaporator coupled to said compressor and arranged in heat exchange relationship with water to be in contact therewith, said evaporator including a plurality of freezing plates each having a first passageway therein arranged to conduct relatively cold evaporating refrigerant therethrough in heat exchange relationship with water to be in contact with the outer surfaces of said freezing plates to form said ice on the outer surface of at least one of said freezing plates, and a second passageway therein arranged to conduct relatively warm refrigerant therethrough in heat exchange relationship with the ice to be formed on the outer surface of at least one of said freezing plates to release said ice, each of said passageways having inlet and outlet ends, respectively, and valve means coupled between said freezing plates arranged to selectively direct said refrigerant between said first and second passageways in each of said freezing plates to enable said ice to be selectively formed on and released from the outer surfaces of said freezing plates.

8. A heat pump system according to claim 7, further including means for circulating said water in heat exchange relationship with a space to be cooled.

9. A heat pump system according to claim 7, further including means for reducing the pressure of the refrigerant coupled between the outlet end of the second passageway of one of said freezing plates and the inlet end of the first passageway in another of said freezing plates.

10. A heat pump system according to claim 9, wherein said pressure reducing means comprises an expansion valve.

11. A heat pump system according to claim 9, wherein said pressure reducing means comprises a capillary tube.

12. A heat pump system according to claim 7, wherein said valve means comprises a fluid valve and further includes means for actuating said fluid valve in response to ice formed on at least one of said freezing plates.

13. A heat pump system according to claim 12, wherein said actuating means actuates said fluid valve in response to a predetermined thickness of ice.

14. An ice-making heat pump system comprising a compressor for circulating a supply of refrigerant through said system, a condenser arranged in heat exchange relationship with said refrigerant for removing heat from said refrigerant, a tank for containing a supply of water, and an evaporator coupled to said compressor and said condenser, said evaporator being arranged to be substantially submerged in said supply of water and including a plurality of freezing plates each having a first passageway therein arranged to conduct relatively cold evaporating refrigerant therethrough in heat exchange relationship with said supply of water to form ice on the outer surface of at least one of said freezing plates, and a second passageway therein arranged to conduct relatively warm refrigerant therethrough in heat exchange relationship with the ice to be formed on the outer surface of at least one of said freezing plates to release said ice, each of said passageways having inlet and outlet ends, respectively, and valve means coupled between said freezing plates arranged to selectively direct said refrigerant between said first and second passageways in each of said freezing plates to enable said ice to be selectively formed on and released from the outer surfaces of said freezing plates.

15. A heat pump system according to claim 14, further including means communicating with said tank for circulating said supply of water in heat exchange relationship with a space to be cooled.

16. A heat pump system according to claim 14, further including means for reducing the pressure of the refrigerant coupled between the outlet end of the second passageway of one of said freezing plates and the inlet end of the first passageway in another of said freezing plates.

17. A heat pump system according to claim 16, wherein said pressure reducing means comprises an expansion valve.

18. A heat pump system according to claim 16, wherein said pressure reducing means comprises a capillary tube.

19. A heat pump system according to claim 14, wherein said valve means comprises a fluid valve and further includes means for actuating said fluid valve in response to ice formed on at least one of said freezing plates.

20. A heat pump system according to claim 19, wherein said actuating means actuates said fluid valve in response to a predetermined thickness of ice.

21. An ice-making heat pump system comprising a compressor for circulating a supply of refrigerant through said system, a condenser arranged in heat exchange relationship with said refrigerant for removing heat from said refrigerant, a tank for containing a supply of water, an evaporator coupled to said compressor and said condenser, said evaporator being arranged substantially above said supply of water, means communicating with said supply of water for spraying said water onto said evaporator, said evaporator including a plurality of freezing plates each having a first passageway therein arranged to conduct relatively cold evaporating refrigerant therethrough in heat exchange relationship with water to be sprayed on the outer surfaces of said freezing plates to form ice on the outer surface of at least one of said freezing plates, and a second passageway therein arranged to conduct relatively warm refrigerant therethrough in heat exchange relationship with the ice to be formed on the surface of at least one of said freezing plates to release said ice, each of said passageways having inlet and outlet ends, respectively, and valve means coupled between said freezing plates arranged to selectively direct said refrigerant between said first and second passageways in each of said freezing plates to enable said ice to be selectively formed on and released from the outer surfaces of said freezing plates.

22. A heat pump system according to claim 21, further including means communicating with said tank for circulating said supply of water in heat exchange relationship with a space to be cooled.

23. A heat pump system according to claim 21, further including means for reducing the pressure of the refrigerant coupled between the outlet end of the second passageway of one of said freezing plates and the inlet end of the first passageway in another of said freezing plates.

24. A heat pump system according to claim 23, wherein said pressure reducing means comprises an expansion valve.

25. A heat pump system according to claim 23, wherein said pressure reducing means comprises a capillary tube.

26. A heat pump system according to claim 21, wherein said valve means comprises a fluid valve and further includes means for actuating said fluid valve in response to ice formed on at least one of said freezing plates.

27. A heat pump system according to claim 26, wherein said actuating means actuates said fluid valve in response to a predetermined thickness of ice.

28. A heat pump system according to claim 21, wherein said spray means includes means for selectively spraying said water onto said freezing plates.

29. A heat pump system according to claim 28, wherein said selective spraying means includes means responsive to ice formed on at least one of said freezing plates.

30. An ice-making heat pump system comprising a compressor for circulating a supply of refrigerant through said system, a condenser arranged in heat exchange relationship with said refrigerant for removing heat from said refrigerant, an evaporator coupled to said compressor and arranged in heat exchange relationship with water to be in contact therewith, said evaporator including a plurality of freezing plates arranged in respective sets, each of said freezing plates having a first passageway therein arranged to conduct relatively cold evaporating refrigerant therethrough in heat exchange relationship with water to be in contact with the outer surfaces of said freezing plates to form ice thereon, and a second passageway therein arranged to conduct relatively warm refrigerant therethrough in heat exchange relationship with said ice to release said ice, the first and second passageways of the freezing plates in each said freezing plate set having inlet and outlet ends and being arranged in parallel with each other, and valve means coupled between each of said sets of freezing plates arranged to selectively direct said refrigerant between said first and second parallel passageways in each of said sets of freezing plates to enable said ice to be selectively formed on and released from the outer surfaces of each said freezing plate set.

31. A heat pump system according to claim 30, further including means for circulating said water in heat exchange relationship with a space to be cooled.

32. A heat pump system according to claim 30, further including means for reducing the pressure of the refrigerant coupled between the outlet ends of the second passageways of one of said freezing plate sets and the inlet ends of the first passageways in another of said freezing plate sets.

33. A heat pump according to claim 32, wherein said pressure reducing means comprises an expansion valve.

34. A heat pump system according to claim 32, wherein said pressure reducing means comprises a capillary tube.

35. A heat pump system according to claim 30, wherein said valve means comprises a fluid valve and further includes means for actuating said fluid valve in response to ice formed on at least one of said freezing plate sets.

36. A heat pump according to claim 35, wherein said actuating means actuates said fluid valve in response to a predetermined thickness of ice.

* * * * *